Aug. 4, 1925.

H. W. CAMPBELL

MILK STRAINER

Filed Oct. 13, 1924

1,548,509

Inventor
H. W. Campbell,
By
Attorney

Patented Aug. 4, 1925.

1,548,509

UNITED STATES PATENT OFFICE.

HARRY W. CAMPBELL, OF GOLDFIELD, IOWA.

MILK STRAINER.

Application filed October 13, 1924. Serial No. 743,352.

*To all whom it may concern:*

Be it known that I, HARRY W. CAMPBELL, a citizen of the United States, residing at Goldfield, in the county of Wright and State of Iowa, have invented certain new and useful Improvements in Milk Strainers, of which the following is a specification.

This invention relates to new and useful improvements in milk strainers. Strainers now commonly in use are provided in the bottom with a copper sieve for straining the milk and which is permanently secured in place by solder. On account of the necessity of frequently washing and cleaning the sieve for sanitary reasons, however, the same often becomes loose and must be repaired.

The principal object of my invention is to overcome or obviate the above objection by providing a strainer with a sieve held in place by a detachable spring device and which may be easily and readily removed for cleaning and then as easily replaced as occasion requires.

With the foregoing and other objects in view that will appear as the nature of my invention is better understood, the same consists in the novel features of construction, combination and arrangement of parts illustrated in the drawings and more particularly pointed out in the appended claim.

In the accompanying drawings which are for illustrative purposes only and are therefore not drawn to scale:

Figure 1:
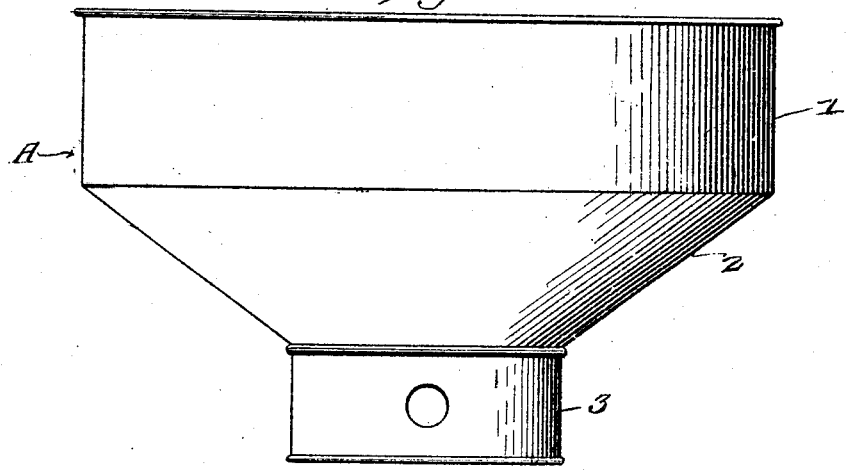
Figure 1 is a side elevation of a milk strainer embodying my improvements.
Figure 2:
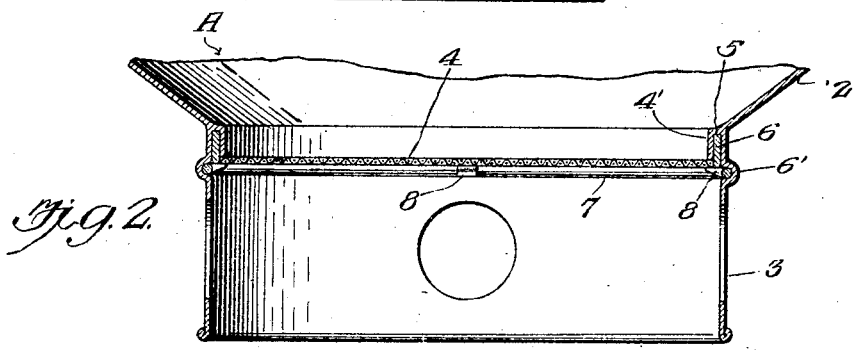
Figure 2 is an enlarged vertical transverse section of the lower end of the strainer and associated parts.
Figure 3:
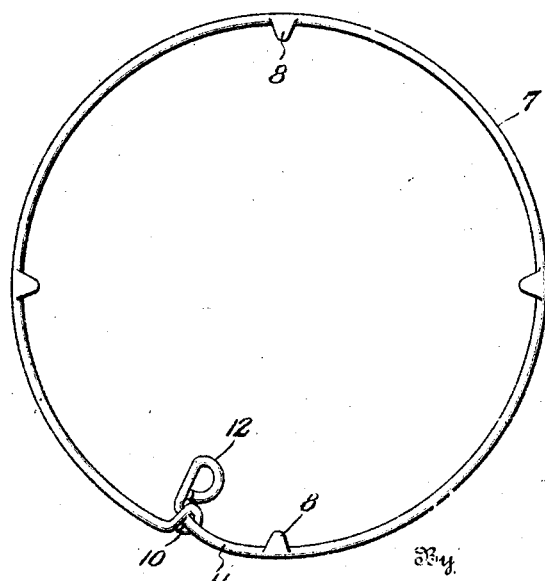
Figure 3 is a detail plan view of the resilient keeper ring.

Referring to the drawings for a more particular description of my invention and in which drawings like parts are designated by like reference characters throughout the several views, A represents the strainer as a whole, comprising the cylindrical mouth 1, downwardly flared or tapered intermediate portion 2, a smaller cylindrical bottom portion 3 and a flat disc shaped sieve 4 of copper or other reticulated material having a suitable mesh.

In carrying out my invention the strainer is provided at the junction of its intermediate portion 2 with the bottom portion 3, with an annular downwardly extending flange 4', which is disposed inwardly of and in concentric relation with the upper end of the bottom portion 3, forming an annular space or groove 5 adapted to receive an annular upwardly projecting flange 6 formed at the edge or perimeter of the copper sieve. The upper end of the bottom portion 3 of the strainer is formed immediately below the sieve 4 with an annular groove or depression 6 in which is adapted to seat a resilient wire keeper ring 7. This ring is provided equi-distances apart around its circumference with a plurality of inwardly projecting lugs 8 which fit against the bottom edge of the copper sieve and support the latter in removable position.

One end of the keeper ring is formed with an eye 10, while the opposite end 11 thereof extends through said eye and terminates in a loop 12 forming a handle adapted to be grasped by the operator in contracting and removing the keeper ring preparatory to releasing and removing the copper sieve for cleaning.

From the foregoing description taken in connection with the drawings, it is thought that the construction, operation and advantages of my improvement will be readily understood without requiring a more extended explanation.

Having described my invention what I claim as new and desire to secure by Letters Patent, is:—

In a strainer of the character specified, a copper sieve removably mounted in the bottom thereof, a detachable resilient keeper ring for supporting the sieve in place when said keeper ring is in normal expanded condition, means for contracting the keeper ring preparatory to releasing and removing the sieve, and a plurality of lugs carried by the keeper ring and forming a support for the bottom edge of the sieve.

In testimony whereof I affix my signature.

HARRY W. CAMPBELL.